(12) United States Patent
Pham

(10) Patent No.: US 12,115,899 B2
(45) Date of Patent: Oct. 15, 2024

(54) RECREATIONAL VEHICLES WITH SLIDE-OUT ROOM FORMING A SHELL OVER THE MAIN ROOM

(71) Applicant: Tuan Anh Pham, Fountain Valley, CA (US)

(72) Inventor: Tuan Anh Pham, Fountain Valley, CA (US)

( * ) Notice: Subject to any disclaimer, the term of this patent is extended or adjusted under 35 U.S.C. 154(b) by 284 days.

(21) Appl. No.: 17/752,769

(22) Filed: May 24, 2022

(65) Prior Publication Data

US 2023/0382287 A1    Nov. 30, 2023

(51) Int. Cl.
*B60P 3/34* (2006.01)
(52) U.S. Cl.
CPC ...................................... *B60P 3/34* (2013.01)
(58) Field of Classification Search
CPC ........... B60P 3/34; B60P 3/39; B62D 33/0612
USPC .......................................... 296/165, 171, 173
See application file for complete search history.

(56) References Cited

U.S. PATENT DOCUMENTS

| | | | | | |
|---|---|---|---|---|---|
| 3,212,810 | A | * | 10/1965 | Bass | B60P 3/34 |
| | | | | | 296/171 |
| 3,740,088 | A | * | 6/1973 | Ratcliff | B60P 3/34 |
| | | | | | D12/104 |
| 4,106,732 | A | * | 8/1978 | Whiting | B60P 3/34 |
| | | | | | 296/171 |
| 4,133,571 | A | * | 1/1979 | Fillios | B60P 3/34 |
| | | | | | 296/165 |
| 5,374,094 | A | * | 12/1994 | Smith | B60P 3/34 |
| | | | | | 296/26.05 |
| 5,628,541 | A | * | 5/1997 | Gardner | B60P 3/34 |
| | | | | | 296/165 |
| 9,597,993 | B2 | * | 3/2017 | Pellicer | B62D 63/061 |
| 11,498,472 | B2 | * | 11/2022 | König | E04B 1/3431 |
| 11,827,447 | B2 | * | 11/2023 | Trout | E04B 1/3431 |
| 2011/0057474 | A1 | * | 3/2011 | Cunningham | B60P 3/38 |
| | | | | | 296/165 |
| 2019/0143875 | A1 | * | 5/2019 | Pham | B60P 3/34 |
| | | | | | 296/175 |

* cited by examiner

*Primary Examiner* — Jason S Daniels
(74) *Attorney, Agent, or Firm* — Nguyen Huu Nguyen

(57) ABSTRACT

The present invention relates to a vehicle having a fixed room and an outer shell slide-out room which extends and retracts relative to the fixed room. The slide-out room having a side opening substantially larger than the side area of the fixed room for the outer shell to slide over the fixed room. The slide-out room having a substantially larger volume than the fixed room having the slide-out room to extend and retract by sliding over the fixed room through a side opening and having the fixed room to occupy substantially the interior space of the outer shell slide-out room. The fixed room includes a main floor section, sidewall sections, and a roof section. Furthermore, when the slide-out room is retracted, the slide-out floor slides under the main floor to tuck underneath the fixed room floor. The vehicle of the present invention may have other slide-out assemblies in the fixed room and the outer shell slide-out room.

5 Claims, 3 Drawing Sheets

RECREATIONAL VEHICLES WITH SLIDE-OUT ROOM FORMING A SHELL OVER THE MAIN ROOM

BACKGROUND OF THE INVENTION

Field of the Invention

The present invention relates to recreational vehicles (RV's), and more particularly, to motor homes and travel trailers that are adapted in size so as to increase the available living space of the vehicle.

Discussion of Prior Art

Present day recreational vehicles with slide-out rooms are very common. However, numerous prior arts describe slide-out rooms which require a slide-out room protruding through a side-wall opening of the main vehicle body to provide additional living space. The moveable rooms are substantially smaller in volume comparing to the main room in order to be able to protrude through the cut-out of the main room side-wall. As such, the dimensions of the slide-out room need to be less than the dimensions of the cut-out area of the opening of the main vehicle. Randall L. Graber, U.S. Pat. No. 6,257,638 B1 disclosed a slide-out designed for a travel trailer having a rear end side-wall with an extendable slide-out room protruding through the cut-out of the rear end side-wall in the extended mode. Another prior art disclosed by U.S. Pat. No. 7,229,123 B2 to James R. Kunz. In James Kunz patent, the slide-out room is also extended through a cut-out of the side-wall in the extended mode.

Therefore, what is desired is a method and system that can provide a slide-out room with larger dimensions than the main vehicle to overcome the limitations of prior art.

SUMMARY OF THE INVENTION

In one aspect of the present invention, a vehicle body structure is provided with a slide-out room over the main body living room of the vehicle. In an exemplary embodiment, the vehicle comprises a fixed room, a slide-out room, and a slide-out extension mechanism capable of extending and retracting the slide-out room relative to the fixed room. Presently, the slide-out extension mechanism comprising of commercial components readily available for purchase from a number of Original Equipment Manufacturers (OEM). In one aspect of the present invention, the fixed room comprises a roof section, a floor section, a three-sided sidewall section with the opening facing toward the slide-out room opening. The slide-out room comprising a roof section, a floor section, a three-sided sidewall section with the opening facing toward the opening side of the fixed room forming a room extension to the fixed room. The slide-out room having a sufficient larger volume than the fixed room to allow the slide-out room to slide over and surround substantially the entirety of the fixed room in the fully retracted position. Furthermore, the slide-out room is supported by a plurality of rollers or slidable members and structurally attached to the slide-out extension mechanism to extend and to retract the slide-out room in a cantilevered manner.

In another aspect of the invention, when the slide-out room is extended out, substantially half of the slide-out floor is on one side of the fixed room, the substantial remaining half of the slide-out floor remains on the fixed room side having the fixed room to act as counterweight for the slide-out room. Furthermore, when the slide-out room is extended out, the portion of the slide-out floor tucked underneath the fixed room floor will slide out to provide floor coverage for the displaced floor area beyond the fixed room floor area. Moreover, the fixed room floor edge at the fixed room opening area having an inclined edge so that the floor level between the slide-out room floor and the fixed room floor will have a slight incline slope to prevent tripping hazards. Furthermore, to help with the slide-out floor sliding under the fixed room floor, along the floor edge of the fixed floor opening area above the slide-out floor is fitted with rollers at the floor bottom facing the floor of the slide-out room. These rollers will assist the slide-out floor to slide under the fixed floor more readily.

This brief summary, rather broadly, has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

The following detailed description is of the best currently contemplated mode for carrying out the invention. The detailed description is not to be taken in a limiting sense, but the detailed description is made merely for the purpose of illustrating the general principles of the invention, since the scope of the invention is best defined by the appended claims.

Figure 1:
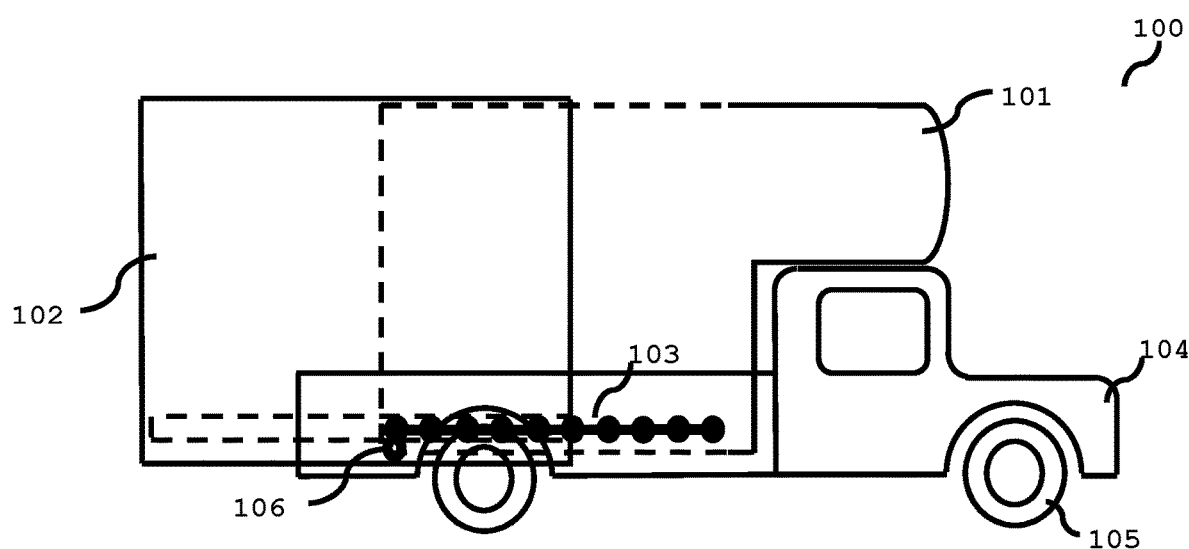
FIG. 1 is a cross-sectional view of a RV body structure comprises of a rigid enclosed body shell forming a fixed room, a slide-out extension mechanism, and a carriage assembly with wheels and floor structure support (not shown), and a slide-out room in the extended positions.

FIG. 1 illustrates one embodiment of a RV's body structure 100 comprising of a rigid body shell forming a fixed room 101, a carriage assembly 104 having a plurality of wheels 105, and a slide-out room 102 in the extended position. The body structure 100 may be part of a motorized RV or a towable trailer. FIG. 1 further illustrates a fixed room 101 that is mounted above carriage assembly 104 having an opening on the rear side-wall facing the interior of the slide-out room 102 to accommodate access to the slide-out room. The slide-out rooms 102 having an opening on the side-wall facing the opening of the fixed room 101 and having the slide-out room forming a shell that has sufficient overlap with the fixed room at the side-wall opening. Furthermore, slide-out room 102 is coupled to the fixed room 101 by roller assembly 103 having either electrically, or hydraulically, or electro-mechanically operated slide-out mechanism (not shown) in order to extend or retract the slide-out room when desire. Moreover, to help with the slide-out floor sliding under the fixed room floor, the floor edge of the fixed floor at the fixed room opening above the slide-out floor is fitted with rollers 106 at the floor bottom facing the floor of the slide-out room. In the preferred embodiment, the exterior wall of slide-out room 102 having at least one entry door to facilitate access into the interior living space of the body structure 100. The slide-out rooms 102 can be selectively placed in the extended position so as to effectively increase the desired living space of RV body structure 100.

Figure 2:
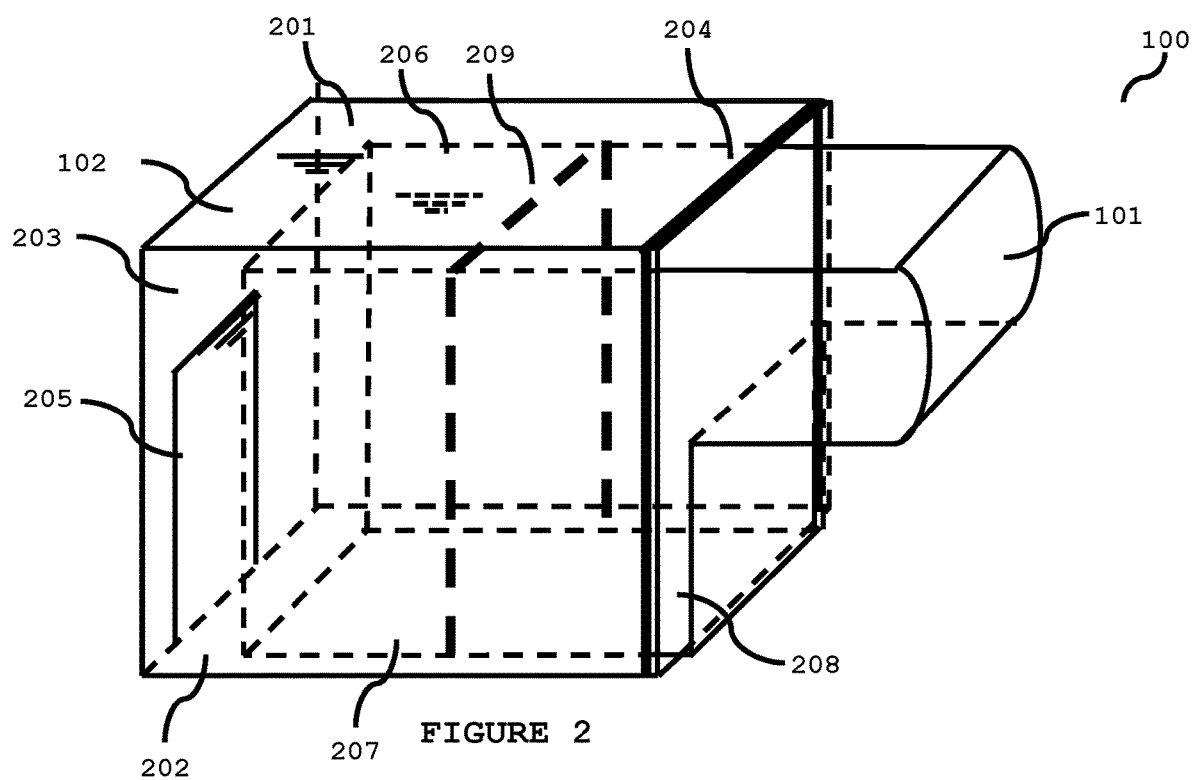
FIG. 2 is a perspective view of the slide-out room in accordance with present invention.

FIG. 2 illustrates, not to be taken in a limiting sense, a detailed plan of the slide-out room 102 and the fixed room 101 of FIG. 1. In FIG. 2, the fixed room 101 comprises of a roof 206, a floor section 207 and a plurality of side-walls 208. In one aspect of the present invention, the slide-out room 102 comprises of a roof 201, a floor section 202 and a plurality of side-walls 203 having substantial overlapping areas of the roof, the side-walls area and the floor space of the fixed room 101 so that the living space of structure 100 is still having the slide-out roof, side-walls, and floor coverage when the slide-out room 102 is in fully extended mode. Along the edges of the plurality of sidewalls 203 and roof 201 of the slide-out room opening facing the interior of the fixed room 101 of FIG. 1, the slide-out room 102 and the fixed room 101 have a plurality of stop walls 204 and 209, respectively, mounted opposing to each other in the sidewall gaps between the overlapping side-walls and roofs of each room. The stop walls are lined with commercially available rubber seal forming a weather tight seal to the slide-out opening of slide-out room 102 when the slide-out room is the fully extended mode. In one aspect of the present invention, slide-out room 102 is at the rear of the fixed room of the body structure 100. The sufficient overlapping of the slide-out room 102 and the fixed room 101 provides structural support for the slide-out room 102 when it is fully extended outside the body of the fixed room 101 of FIG. 1.

Figure 3:
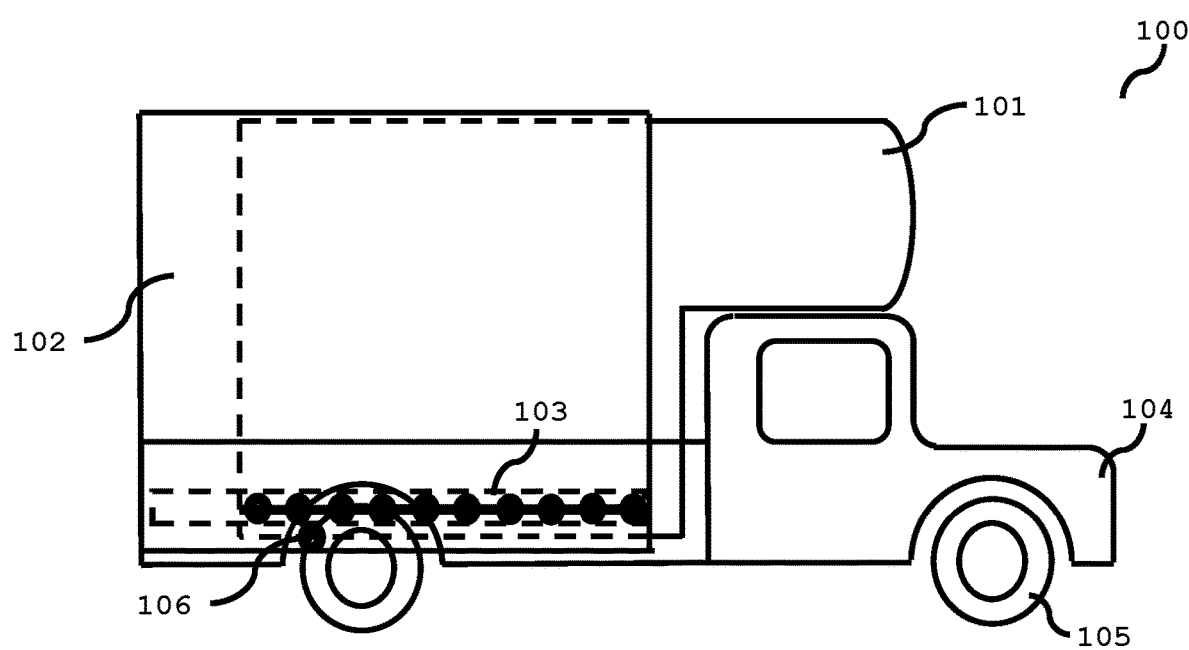
FIG. 3 is the cross-sectional view of the RV body structure of FIG. 1 with the slide-out room in the fully retracted positions; having a substantial portion of the slide-out floor tucked under the main floor of the fixed room.

We now refer to FIG. 3, not to be taken in a limiting sense. FIG. 3 depicts slide-out room 102 in the fully retracted mode with a substantial portion of the slide-out room floor 202 slid under the fixed room floor 207 allowing the slide-out 102 being fully retracted for travel.

Although the present invention has been described with reference to specific embodiments, these embodiments are illustrative only and not limiting. Many other applications and embodiments of the present invention will be apparent in light of this disclosure and the following claims.

The invention claimed is:

1. An expansible body structure for recreational vehicles, comprising:
   a carriage assembly having a plurality of wheels;
   a main living space enclosure having a floor, said enclosure being mounted onto said carriage assembly;
   an extendable slide-out assembly having a separate floor, said slide-out assembly having means for mounting outside and substantially surrounded said main enclosure in the fully retracted position; and
   said slide-out assembly further comprising means for extending and retracting so that said slide-out floor can slide out and in, respectively, under said main floor.

2. The expansible body structure of claim 1, wherein a plurality of rollers is positioned between said main floor and said slide-out floor.

3. The expansible body structure of claim 1, further including the means for tucking said slide-out floor under said main floor in the fully retracted position.

4. The expansible body structure of claim 1, wherein said main enclosure and said slide-out assembly having a plurality of stop walls installed therein to form a weather tight seal.

5. The expansible body structure of claim 4, wherein said slide-out assembly being partially extended out to one of said stop walls such that substantially half of said assembly still being remained and surrounding said main enclosure to act as counterweight.

\* \* \* \* \*